United States Patent [19]

Legler

[11] 4,287,115

[45] Sep. 1, 1981

[54] FILLER MIXTURES AND THERMOSET RESINS CONTAINING SAME

[75] Inventor: Bobby Legler, Lake Jackson, Tex.

[73] Assignee: The Dow Chemical Company, Midland, Mich.

[21] Appl. No.: 93,769

[22] Filed: Nov. 13, 1979

[51] Int. Cl.$^3$ .............................................. C08L 63/04
[52] U.S. Cl. ........................... 260/37 EP; 106/288 B; 260/37 N; 260/38; 260/40 R
[58] Field of Search ....................... 260/37 EP, 37 N; 106/288 B

[56] References Cited

U.S. PATENT DOCUMENTS

| T948,009 | 7/1976 | Greminger et al. | 106/93 |
| 3,354,114 | 11/1967 | Doyle | 260/37 EP |
| 3,374,169 | 3/1968 | Kasten et al. | 260/37 EP |
| 3,828,000 | 8/1974 | Luck et al. | 260/37 EP |
| 3,839,281 | 10/1974 | Dreher | 260/37 EP |

OTHER PUBLICATIONS

Katz et al., Handbook of Fillers and Reinforcements for Plastics, 1978, Van Nostrand Reinhold Co., Chapter 4, pp. 66–78.
Ibid., Chapter 8, pp. 136–159, Chapter 18, pp. 301–316, Chapter 22, pp. 405–414, Chapter 23, pp. 415–427, Chapter 24, pp. 428–445.

*Primary Examiner*—Lewis T. Jacobs
*Attorney, Agent, or Firm*—J. G. Carter

[57] ABSTRACT

Filler mixtures containing an amorphous-pyrogenic or fumed silica and a micro or short fiber filler material such as calcium silicate are useful in preparing trowelable thermosettable resin compositions. They are particularly suitable for use in epoxy resin compositions.

25 Claims, No Drawings

FILLER MIXTURES AND THERMOSET RESINS CONTAINING SAME

BACKGROUND OF THE INVENTION

Curable resin systems have been modified with fillers so as to render them thixotropic so that they can be trowelled. Such fillers as asbestos and colloidal silica have been used. These fillers are very dusty which provides an unsuitable environment when mixing into the resin systems. Furthermore, asbestos is believed to possess carcinogenic tendencies.

It has now been discovered that the dustiness of these fillers can be reduced by employing a mixture of amorphous pyrogenic or fumed silica with a micro or short fiber inorganic material. Such mixtures are advantageous in that they are free-flowing, relatively dust free and are more readily mixed into the resin system than the filler without the micro or short fiber inorganic filler material. Another advantage to the filler mixture is that less quantities of the micro or short fiber inorganic filler material are required to render the resin system trowelable when it is employed with the amorphous-pyrogenic or fumed silica.

SUMMARY OF THE INVENTION

The present invention concerns a filler mixture comprising (a) from about 1 to about 20, preferably from about 5 to about 15 percent by weight of amorphous-pyrogenic or fumed silica and (b) from about 80 to about 99, preferably from about 85 to about 95 percent by weight of a micro or short fiber, inorganic mineral material.

The present invention also concerns a filled, curable thermosettable resin composition containing a curing quantity of a curing system therefor and a sufficient quantity of a filler mixture so as to render the composition non-flowable and trowelable, said filler mixture comprising (a) from about 1 to about 20, preferably from about 5 to about 15 percent by weight of amorphous-pyrogenic or fumed silica and (b) from about 80 to about 99, preferably from about 85 to about 95 percent by weight of a micro or short fiber inorganic filler material.

DESCRIPTION OF THE INVENTION

Suitable thermosettable resins which can be employed herein include, epoxy resins, polyester resins, polyurethane resins, vinyl ester resins and the like.

Curing agents for the epoxy resins include amines, polycarboxylic acids and anhydrides thereof, Lewis acids and the like.

Suitable epoxy resins and curing agents therefor are more fully described in *Handbook For Epoxy Resins* by Lee and Neville, McGraw-Hill, 1967, which is incorporated herein by reference.

Suitable polyester resins and curing mechanisms therefor are more fully described in *Unsaturated Polyester Technology* by P. F. Bruins, Gordon and Breach, 1976, which is incorporated herein by reference.

Suitable vinyl ester resins and curing mechanisms therefor are more fully described in U.S. Pat. Nos. 3,367,992; 3,564,074; 3,632,861; 3,720,592; 3,810,825; 3,810,826; 3,816,283 and 3,892,819 which are incorporated herein by reference.

Suitable polyurethanes can be prepared from polyether and polyester polyols and polyisocyanates as described in *Polyurethanes: Chemistry and Technology, II Technology*, by Saunders and Frisch, Interscience, 1964 which is incorporated herein by reference.

Particularly suitable resins for use herein are the liquid epoxy resins of the diglycidyl ether of bisphenol A type and liquid phenol-formaldehyde novolac epoxy resins. Particularly suitable curing agents are the polyamides.

Amorphous-pyrogenic or fumed silica which can be suitably employed herein include the amorphous-pyrogenic or fumed silica as described in *Handbook of Fillers and Reinforcement for Plastics*, edited by Katz and Milewski, Van Nostrand Reinhold Co., 1978, pp 137-140 which is incorporated herein by reference.

Suitable inorganic micro or short fiber filler materials which can be employed herein include calcium silicate (Wollastonite, $CaSiO_3$), asbestos, Processed Mineral Fiber, fibrous (a white to light gray, free-flowing short fiber comprising about 75% calcium silicate with the balance consisting of oxides of aluminum, magnesium and other light weight metals) crystalline calcium sulfate, sodium aluminum hydroxycarbonate (Dawsonite), inorganic titanate fibers, mixtures thereof and the like. These are more fully described in *Handbook of Fillers and Reinforcements*, ibid, pp 405-445 which is incorporated herein by reference.

While asbestos is suitable for use herein from a technical standpoint, it is not recommended for commercial applications since it is suspected of being a potential carcinogen.

The filler compositions of the present invention may contain minor amounts of other components such as dyes, pigments, auxiliary particulate fillers, metal particles, surfactants, certain solid or crystalline curing agents and fibrous fillers with larger than microscopic fibers, and the like.

The filler compositions of the present invention can be prepared by combining the several components and stirring by low shear methods such as V-blenders, barrel tumbling and the like, slow speed paddle stirring, ribbon blenders and combinations of these and other methods. Another possible method is fluidized bed operation with air recycle to prevent loss of the light weight components.

It is highly desirable that all agglomerates be broken up and that intimate contact occur between all components. It is also desirable that the fiber length of the fibrous component(s) not be damaged or reduced.

The filler compositions can be blended with the resin compositions by first combining the resin and hardner portions and stirring well then adding the filler composition and stirring by low shear methods such as hand or motorized paddle stirrers, pug mills or ribbon blenders and the like.

In addition to the named materials, the filler mixtures of the present invention also contain the usual quantities of other materials inherent in the materials as available in commerce with attendant impurities and in some instances, various surface treatments.

If desired, the filler mixture can be blended with either the thermosettable resin or the curing system therefor followed by blending with the other component.

The term trowelable as employed herein means that such a composition will not run when applied, trowelled, onto a vertical surface.

The filled, curable compositions of this invention are useful as coatings, linings, repair materials, castable grouts, surfacing materials, mastics, patching compounds, tooling compounds, plastic solders and the like.

The following examples are illustrative of the present invention but are not to be construed as to limit the scope thereof.

The following components were used in the examples and comparative experiments.

Cab-O-Sil M5 is an amorphous colloidal silica commercially available from the Cabot Corp.

Nyad G is a calcium silicate, short fiber, inorganic filler material commercially available from Interpace Corporation.

Calidria Asbestos RG-244 is a short fiber, inorganic filler material commercially available from Union Carbide Corporation.

Processed Mineral Fiber is a short fiber, inorganic filler material commercially available from Jim Walters Resources, Inc.

Mineral Wool is a short fiber, inorganic filler material commercially available from Johns Manville as mineral wool or rock wool.

GENERAL PROCEDURE

Filler Mixture

Masterbatches of the various filler mixtures were prepared by placing all components in a polyethylene bag and kneading, shaking and alternatingly lifting the bag from the floor and lowering it to the floor with one corner of the bag down.

Another method of making small batches was to place all components in a one gallon round can with lid and place on roll mill at 35 to 50 RPM for several hours.

FILLED CURABLE THERMOSETTABLE RESIN COMPOSITION

Portions of the filler mixtures or individual fillers were blended with 100 parts by weight of a phenol-formaldehyde epoxy resin having an average functionality of 2.2 and an average epoxide equivalent weight of 156–170 which was previously blended with 45 parts by weight of a polyamide hardener having an average active hydrogen equivalent weight of about 106.

The quantity of filler employed was that quantity of filler or filler mixture required to render the composition non-flowable and trowelable. The compositions were then trowelled into ½"×½"×5" (1.27 cm×1.27 cm×12.7 cm) molds and then cured at 100° C. for 2 hours.

The type and quantity of filler required to render the mixture non-flowable and trowelable are given in the following table along with the flexural strength values of the cured samples measured on a center loaded 4-inch (10.16 cm) span at a crosshead speed of 0.2 inches (0.5 cm) per minute. The flexural strength was reported at the break point of the material or at the yield point for the more flexible samples.

| | Ex. No. 1 | Comp. Expt. A | Comp. Expt. B | Ex. No. 2 | Comp. Expt. C | Ex. No. 3 | Comp. Expt. D | Ex. No. 4 | Comp. Expt. E |
|---|---|---|---|---|---|---|---|---|---|
| FILLER MATERIAL | | | | | | | | | |
| CAB-O-Sil M-5, pbw[1] | 6.7 | 8 | — | 7 | — | 5.4 | — | 0.58 | — |
| Processed Mineral Fiber, pbw | — | — | — | 63 | 160 | — | — | — | — |
| Mineral Wool, pbw | 60.3 | — | 130 | — | — | — | — | — | — |
| NYAD G, pbw | — | — | — | — | — | 48.6 | 147 | — | — |
| Calidria Asbestos, RG-244 pbw | — | — | — | — | — | — | — | 5.82 | 8 |
| FLEXURAL STRENGHT | | | | | | | | | |
| psi | 4,160 | 11,300 | 4,520 | 11,700 | 8,900 | 12,230 | 9,060 | 9,800 | 11,300 |
| kg/cm² average of samples[2] | 292 | 794 | 318 | 823 | 626 | 860 | 637 | 689 | 794 |

[1] pbw = parts by weight
[2] The strength reported is an average of the number of samples indicated.

I claim:

1. A filler mixture comprising
   (a) from about 1 to about 20 percent by weight of amorphous-pyrogenic silica and
   (b) from about 80 to about 99 percent by weight of a micro or short fiber inorganic filler material.

2. The mixture of claim 1 wherein component (a) is present in quantities of from about 5 to about 15 percent by weight and component (b) is present in quantities of from about 85 to about 95 percent by weight.

3. The mixture of claim 2 wherein component (b) is selected from mineral wool, a white to light gray, free-flowing short fiber comprising about 75% calcium silicate with the balance consisting of oxides of aluminum, magnesium and other light weight metals or calcium silicate.

4. The mixture of claim 3 wherein component (b) is calcium silicate.

5. A filled, curable, thermosettable resin composition containing a thermosettable resin, a curing quantity of a curing system therefor and a sufficient quantity of a filler mixture so as to render the composition non-flowable and trowelable, said filler mixture comprising (a) from about 1 to about 20 percent by weight of amorphous-pyrogenic silica and (b) from about 80 to about 99 percent by weight of a micro or short fiber inorganic filler material.

6. The composition of claim 5 wherein said filler mixture comprises (a) from about 5 to about 15 percent by weight of amorphous-pyrogenic silica and (b) from about 85 to about 95 percent by weight of a micro or short fiber inorganic filler material.

7. The composition of claim 6 wherein component (b) is selected from mineral wool, a white to light gray, free-flowing short fiber comprising about 75% calcium silicate with the balance consisting of oxides of aluminum, magnesium and other light weight metals or calcium silicate.

8. The composition of claim 7 wherein component (b) is calcium silicate.

9. The composition of claims 5, 6, 7 or 8 wherein the thermosettable resin is a liquid epoxy resin.

10. The composition of claim 9 wherein the epoxy resin is a diglycidyl ether of bisphenol A.

11. The composition of claim 10 wherein the epoxy resin is a phenol-formaldehyde epoxy novolac resin.

12. The composition of claim 9 wherein the curing system is a polyamide.

13. The composition of claim 10 wherein the curing system is polyamide.

14. The composition of claim 11 wherein the curing system is a polyamide.

15. The composition of claims 5, 6, 7 or 8 cured to a thermoset condition.

16. The composition of claim 9 cured to a thermoset condition.

17. The composition of claim 10 cured to a thermoset condition.

18. The composition of claim 11 cured to a thermoset condition.

19. The composition of claim 12 cured to a thermoset condition.

20. The composition of claim 13 cured to a thermoset condition.

21. The composition of claim 14 cured to a thermoset condition.

22. A filled, curable thermosettable resin composition containing a curing quantity of a curing system therefor and a sufficient quantity of a filler mixture defined in claims 1, 2, 3 or 4 to render the composition non-flowable and trowelable.

23. The composition of claim 22 wherein the thermosettable resin is an epoxy resin.

24. The composition of claim 23 wherein the epoxy resin is a diglycidyl ether of bisphenol A.

25. The composition of claim 23 wherein the epoxy resin is a phenol-formaldehyde epoxy novolac resin.

* * * * *

UNITED STATES PATENT AND TRADEMARK OFFICE
CERTIFICATE OF CORRECTION

PATENT NO. : 4,287,115
DATED : September 1, 1981
INVENTOR(S) : Bobby Legler

It is certified that error appears in the above—identified patent and that said Letters Patent is hereby corrected as shown below:

Col. 2, line 20, after "metals)" insert ---fibrous---.

In Table bridging Col. 3 & 4, change the word "STRENGHT" to ---STRENGTH---.

Signed and Sealed this

First Day of December 1981

[SEAL]

Attest:

*Attesting Officer*

GERALD J. MOSSINGHOFF

*Commissioner of Patents and Trademarks*